(12) United States Patent
Jaussi et al.

(10) Patent No.: US 7,170,438 B2
(45) Date of Patent: Jan. 30, 2007

(54) DECISION FEEDBACK EQUALIZER WITH BI-DIRECTIONAL MODE AND LOOKUP TABLE

(75) Inventors: James E. Jaussi, Hillsboro, OR (US);
Bryan K. Casper, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/937,000

(22) Filed: Sep. 8, 2004

(65) Prior Publication Data

US 2006/0049845 A1 Mar. 9, 2006

(51) Int. Cl.
*H03M 1/38* (2006.01)
*H03M 1/34* (2006.01)
*H03K 17/16* (2006.01)
*H03K 19/0175* (2006.01)

(52) U.S. Cl. .......................... 341/162; 326/21; 326/26; 326/30; 326/31; 326/86; 326/90; 341/161

(58) Field of Classification Search ................ 326/26, 326/30, 31, 21, 86, 90; 341/161, 163, 162
See application file for complete search history.

(56) References Cited

U.S. PATENT DOCUMENTS

| | | | | |
|---|---|---|---|---|
| 6,181,268 B1 * | 1/2001 | Miyake et al. | ............. | 341/161 |
| 6,307,497 B1 * | 10/2001 | Leung et al. | ............... | 341/155 |
| 2004/0130469 A1 * | 7/2004 | Casper | ....................... | 341/118 |
| 2005/0057387 A1 * | 3/2005 | Janakiraman et al. | ....... | 341/156 |

OTHER PUBLICATIONS

Lee, Tai-Cheng et al., "A 125-MHz Mixed-Signal Echo Canceller for Gigabit Ethernet on Copper Wire", IEEE Journal of Solid-State Circuits, vol. 36, No. 3, pp. 366-373, Mar. 2001.
Zerbe, Jared L. et al., "Equalization and Clock Recover for a 2.5-10-Gb/s 2-PAM/4-PAM Backplane Transceiver Cell", IEEE Journal of Solid-State Circuits, vol. 38, No. 12, pp. 2121-2130, Dec. 2003.

* cited by examiner

*Primary Examiner*—Rexford Barnie
*Assistant Examiner*—Dylan White
(74) *Attorney, Agent, or Firm*—Ram P. Yadav

(57) ABSTRACT

In one embodiment, a decision feedback equalizer helps mitigate intersymbol interference in a bi-directional signaling environment. In the particular embodiment, the decision feedback equalizer includes a voltage-to-current converter to source a received differential current to first and second node, a latch to provide logic signal when comparing currents sourced to the first and second nodes, a memory unit to store the logic signals, and a mapping circuit to source first and second feedback currents to the first and second nodes. This embodiment further includes a transmitter to transmit data over a transmission line during receiving, and a digital-to-analog converter to provide a differential current to the first and second nodes to substantially cancel that part of the received differential currents contributed by the transmitter. In this embodiment, the mapping circuit may comprise a lookup table to map the stored logic signals into code words, and another digital-to-analog converter to source differential current to the first and second nodes in response to the code words. Other embodiments are described and claimed.

17 Claims, 8 Drawing Sheets

ABSTRACT

DECISION FEEDBACK EQUALIZER WITH BI-DIRECTIONAL MODE AND LOOKUP TABLE

FIELD

The present invention relates to circuits, and more particularly, to a decision feedback equalizer circuit for mitigating intersymbol interference in a communication channel.

BACKGROUND

Communication channels are seldom ideal. Intersymbol interference may result due to channels having a bandwidth smaller than the signal bandwidth, as well as signal reflections from discontinuities on the communication channel. Channel equalization is a method to help mitigate this type of interference. In particular, a decision feedback equalizer (DFE) utilizes past decisions of the receiver to help mitigate intersymbol interference arising from signal reflections. Decision feedback equalizers find application in many communication systems, such as for example a computer server or system such as that depicted in FIG. 1. FIG. 1 provides a high-level abstraction of a portion of a computer server or system, where microprocessor 102 resides on board 104 and communicates with memory 106 on board 108. The communication is by way of striplines on backplane 110. Backplane 110 is connected to boards 104 and 108 by connectors 112. Not shown in FIG. 1 are other memory units and microprocessors, where the various microprocessors and memory units may communicate to one another so as to access or write data and instructions.

Communication of signals over backplane 110 may be modeled by transmission line theory. Often, the signaling is based upon differential signaling, whereby a single bit of information is represented by a differential voltage. For example, FIG. 2a shows drivers 202 and 204 driving transmission lines 206 and 208, respectively. For differential signaling, drivers 202 and 204 drive their respective transmission lines to complementary voltages. Typical curves for the node voltages at nodes n1 and n2 for a bit transition are provided in FIG. 2b, where the bit transition is indicated by a dashed vertical line crossing the time axis. The information content is provided by the difference in the two node voltages.

For short-haul communication, such as for the computer server in FIG. 1, the signal-to-noise ratio is relatively large. If the transmission lines are linear, time-invariant systems having a bandwidth significantly greater than that of the transmitted signal, and if there are no impedance mismatches, then a relatively simple receiver architecture may be employed to recover the transmitted data. Such a receiver is abstracted by comparator 210, which provides a logic signal in response to the difference in the two received voltages at ports 212 and 214.

However, every transmission line has a finite bandwidth, and for signal bandwidths that are comparable to or exceed the transmission line (channel) bandwidth, intersymbol interference may present a problem. Furthermore, actual transmission lines may have dispersion, whereby different spectral portions of a signal travel at different speeds. This may result in pulse spreading, again leading to intersymbol interference. As a practical example, for high data rates such as 10 Gbs (Giga bits per second), the transmission lines used with backplanes or motherboards are such that intersymbol interference is present. Furthermore, there may be transmission lines mismatches, causing signal reflections, which may contribute significantly to intersymbol interference.

A decision feedback equalizer may be used in conjunction with other filters, such as an FIR (Finite Impulse Response) receiver, to help mitigate intersymbol interference. It is desirable for a DFE to allow for bi-directional signaling for simultaneous transmission and reception, to be easily integrated with a FIR equalizer, and to allow for high data rate signaling.

DESCRIPTION OF EMBODIMENTS

Figure 1:
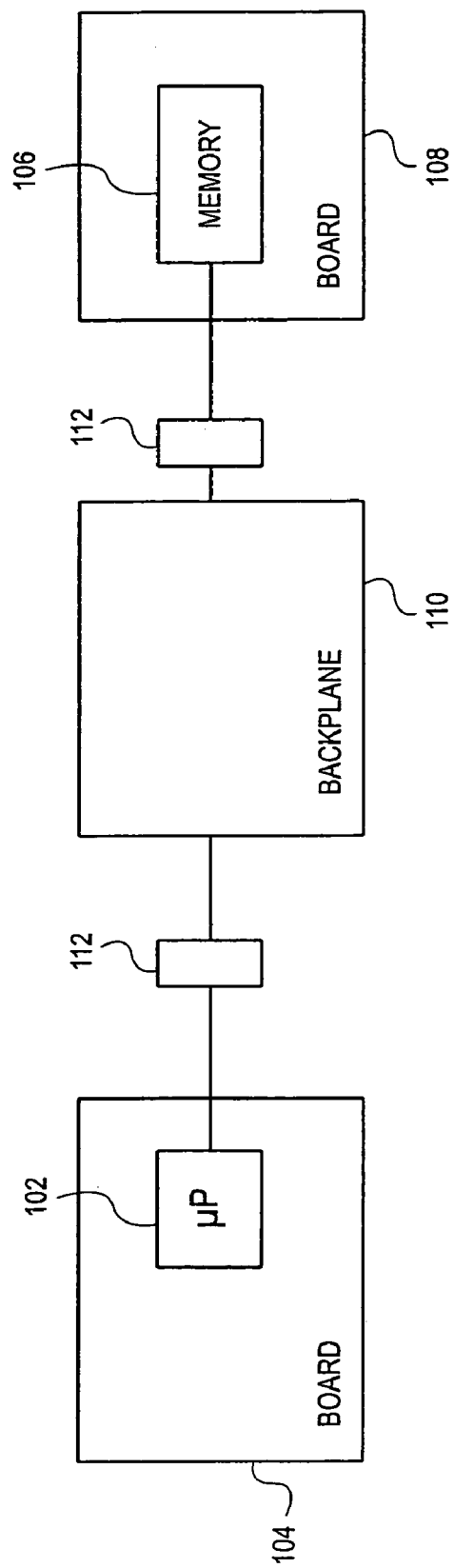
FIG. 1 is a high-level abstraction of a server system, illustrating signaling between boards via a backplane.
Figure 2A:
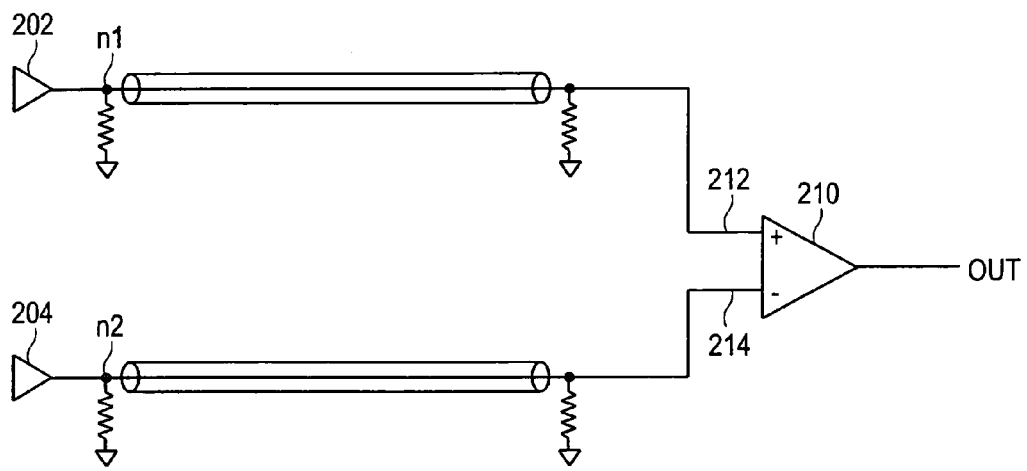
FIG. 2a illustrates differential signaling on two transmission lines.
Figure 2B:
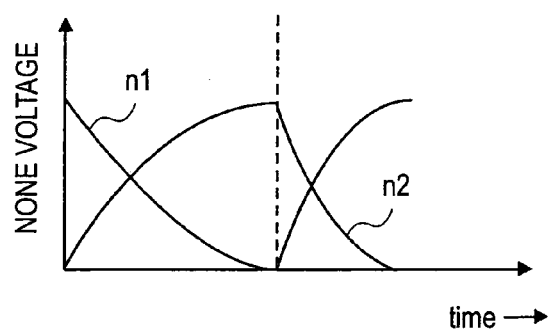
FIG. 2b illustrates node voltage curves for a bit transition.
Figure 3:
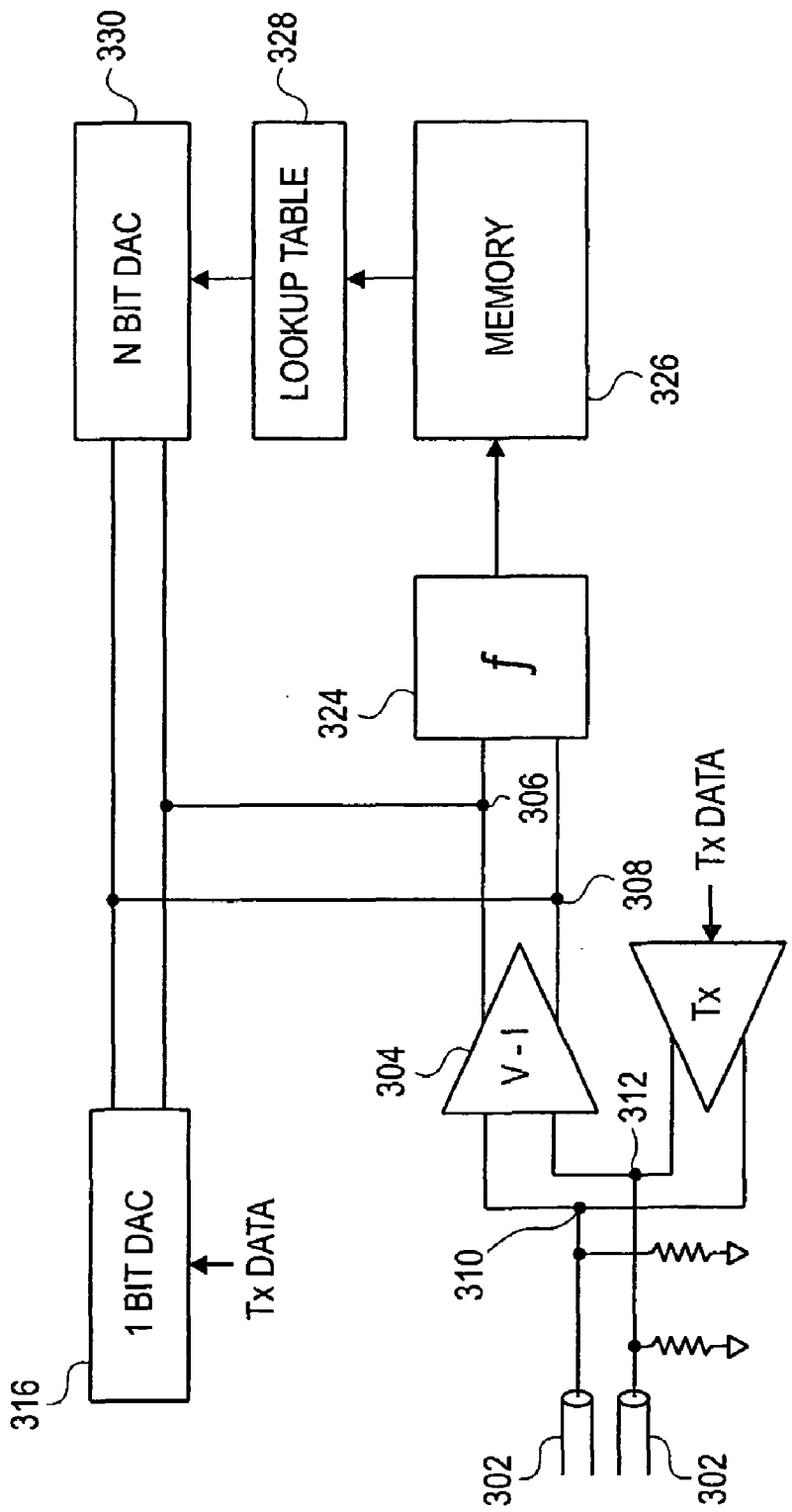
FIG. 3 illustrates a decision feedback equalizer architecture according to an embodiment of the present invention.

A decision feedback equalizer is shown in FIG. 3 at a high-level architectural level. Differential signals are transmitted and received over transmission line 302. V-I (Voltage-to-Current) converter 304 sources a differential current to nodes 306 and 308 in response to a voltage signal at nodes 310 and 312. (For simplicity, we use "source" to mean either "source" or "sink". That is, currents may be sourced to or sunk from nodes 306 and 308, but for simplicity we write that current is sourced to nodes 306 and 308.) Driver 314 is also connected to nodes 310 and 312 to transmit a voltage signal on transmission line 302. To allow for bi-directional communication, the transmit data available to driver 314 is also made available to 1-bit DAC (Digital-to-Analog Converter) 316 so that DAC 316 provides a differential current to nodes 318 and 320 opposite to the differential current contributed by driver 314.

Currents sourced at nodes 306 and 308 are summed and latched by latch functional unit 324 so that latch functional unit 324 outputs a logical (binary) signal indicative of the total differential current sourced into nodes 306 and 308. The logical signals provided by latch 324 during a time interval are stored in memory functional unit 326. Memory functional unit 326 may be a register set, a tap delay line, or other memory structure for storing past outputs of latch 324. At any given bit time, a subset of these stored logical signals are utilized by lookup table 328 to provide a set of logical signals to N-bit DAC 330. The output provided by DAC 330 is a differential current sourced to nodes 306 and 308. The combination of memory 326, lookup table 328, and DAC 330 is to provide a mapping from a subset of past logical signals outputted by latch 324 to a differential current sourced to nodes 308 and 306. In this way, decision feedback is implemented, where the "decisions" are the logical signals outputted by latch 324.

Figure 4A:
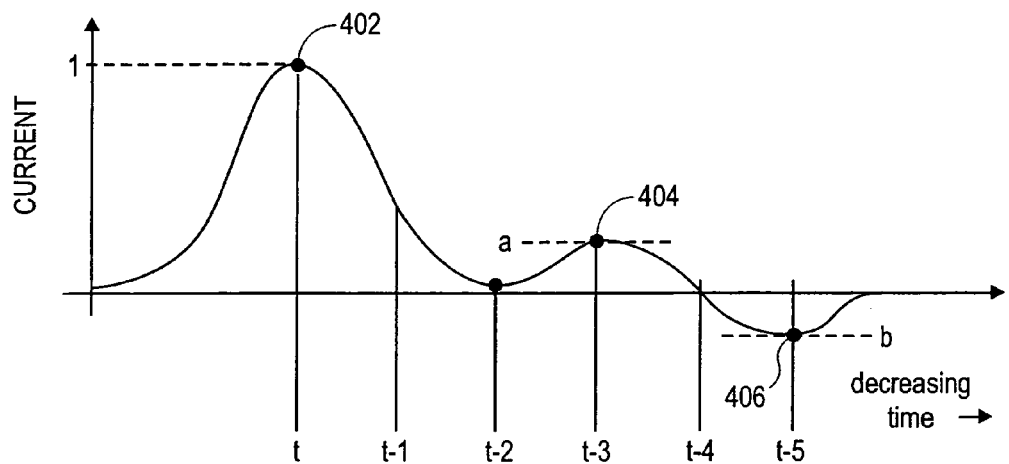
FIG. 4a illustrates an example of an impulse response for a channel with intersymbol interference.
Figure 4B:
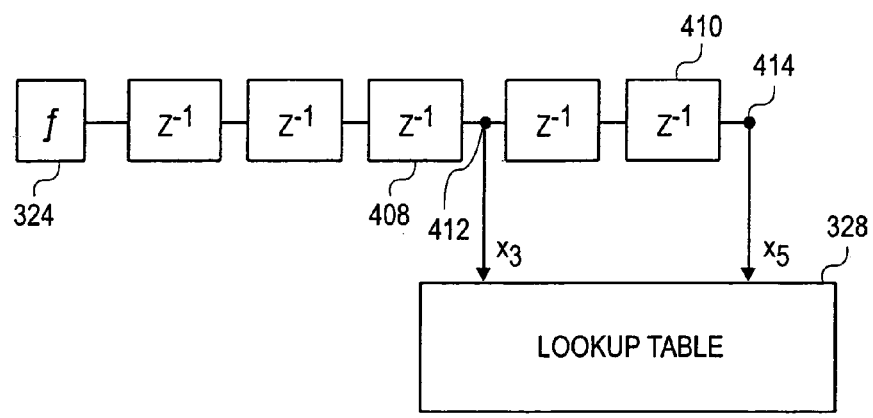
FIG. 4b illustrates a tap delay line used in an decision feedback equalizer according to an embodiment of the present invention.

A relatively simple example may serve to illustrate how the mapping realized by the combination of memory 326, lookup table 328, and N-bit DAC 330 may be chosen. Suppose that when an impulse is transmitted over the communication channel, the difference in currents outputted by V-I converter 304 is as shown in FIG. 4a, where for convenience the time index is chosen so that the peak of the response (402) is at time t and the peak is normalized to unity. Due to reflections, there is a local maximum (404) at time t−3 with height a and a local minimum (406) at time t−5 with height −b, where a and b are both positive and less than one. For the impulse response of FIG. 4a, the tap delay line shown in FIG. 4b serves as memory functional unit 326, where the taps after unit delay element 408 and 410 provide the input to lookup table 328. The unit delay elements shown in FIG. 4b may be realized by flip-flop circuits. Let $x_3$ and $x_5$ denote logical variables for the logical values at nodes (taps) 412 and 414, where the subscripts for these variables were chosen to indicate the positions of their corresponding taps. For the example impulse response shown in FIG. 4a, the mapping provided by the combination of lookup table 328 and N-bit DAC 330 is indicated in the table below.

TABLE 1

(Example Mapping for Lookup Table and N-bit DAC)

| $x_3$ | $x_5$ | Output of N-bit DAC |
|---|---|---|
| 0 | 0 | a − b |
| 1 | 0 | −a − b |
| 0 | 1 | a + b |
| 1 | 1 | −a + b |

It should be noted that the output of N-bit DAC 330 in FIG. 3 is a differential current, but for simplicity the entries in the last column of Table 1 are given as single-ended values. It should be understood that an entry such as a−b is in practice realized by a differential current $I_0-(a-b)$ and $I_0+(a-b)$ outputted by N-bit DAC 330, where $I_0$ is the common-mode current.

The above entries in Table 1 assume antipodal signaling, where a decision having a value of logical 1 is for the case in which a positive current difference is inputted to latch 324, and a decision having a value of logical 0 is for the case in which a negative current difference is inputted to latch 324.

It is not difficult to see how the entries in Table 1 are obtained from the impulse response of FIG. 4a. For example, assuming that correct decisions are being made, and assuming for simplicity that the current bit time is t, then $x_3=0$ implies a previous transmission of a signal for which a negative current difference was received at time t−3, and this contributes a current difference of −a for the current bit time t. Furthermore, $x_5=0$ implies a previous transmission of a signal for which a negative current different was received at time t−5, contributing a current difference of −(−b) =b. Consequently, if $x_3=0$ and $x_5=0$, there would be a contribution of −a +b from the previous transmitted signals, in which case N-bit DAC 330 should provide a current difference of −a (−a +b) −a −b to cancel out the inter symbol interference. Other entries in Table 1 are also straightforward to verify upon inspection of FIG. 4a.

The particular mapping of lookup table 328 depends upon the input-output relationship of N-bit DAC 330. For example, suppose in some suitable units of current that a=0.2 and b=0.1. Suppose N-bit DAC 330 is a 3-bit DAC, and is constructed so that its input-output relationship is as indicated in Table 2 using the same suitable units of current, where again for simplicity only single-ended output current values are provided.

TABLE 2

(Example Input-Output for N-bit DAC)

| Input Code | Output Current |
|---|---|
| 000 | 0 |
| 001 | 0.1 |
| 010 | 0.2 |
| 011 | 0.3 |
| 100 | 0 |
| 101 | −0.1 |
| 110 | −0.2 |
| 111 | −0.3 |

Then, with these values, the logical mapping provided by lookup table 328 should be as indicated in Table 3 so that the effective combination of memory unit 326, lookup table 328, and N-bit DAC 330 provides the proper mapping to cancel intersymbol interference.

TABLE 3

(Example Lookup Table Mapping)

| $x_3$ | $x_5$ | Lookup Table Output |
|---|---|---|
| 0 | 0 | 001 |
| 1 | 0 | 111 |
| 0 | 1 | 011 |
| 1 | 1 | 101 |

Figure 5:
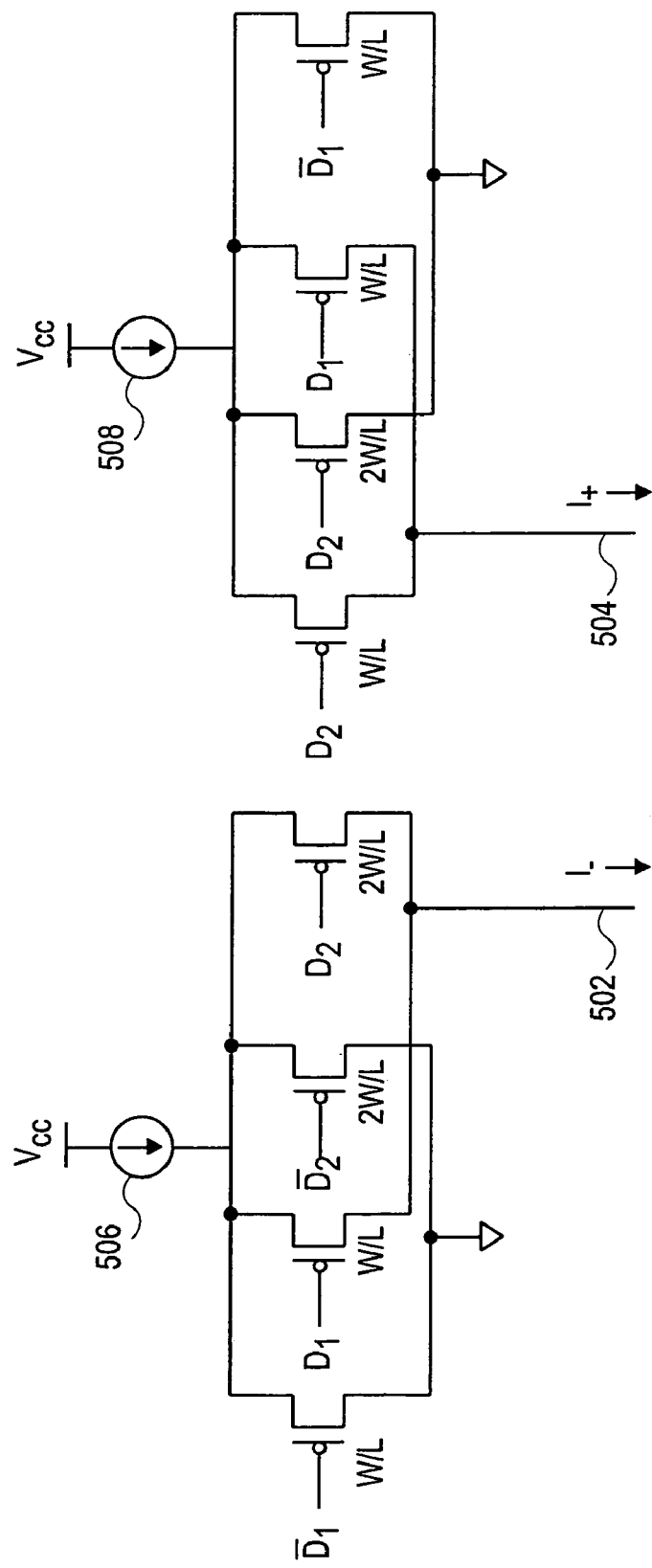
FIG. 5 illustrates a 2-bit DAC.

Implementation of a lookup table mapping in logic is straightforward and need not be described herein. N-bit DAC 330 may be implemented in a number of ways. One such embodiment is provided in FIG. 5. For simplicity, FIG. 5 illustrates a 2-bit DAC, but its generalization to arbitrary bit size is straightforward. In FIG. 5, a 2-bit word ($D_2$, $D_1$) is mapped into a differential current ($I_-$, $I_+$) at output ports 502 and 504. The bit $D_1$ next to a transistor gate indicates that a HIGH voltage $V_{cc}$ is applied to the gate when $D_1=1$ and a LOW voltage $V_{ss}$ is applied to the gate when $D_1=0$. Similar remarks apply to the bit $D_2$. A bar over the bit indicates its complement. The mapping from the word ($D_2$, $D_1$) to the differential current is obtained by shunting a portion of the current from current sources 506 and 508 to ground as indicated in FIG. 5, and allowing the remainder to flow through output ports 502 and 504. The relative effective width-to-length ratios of the transistors in FIG. 5 are indicated as shown. Other embodiments may utilize a different set of relative ratios.

Figure 6:
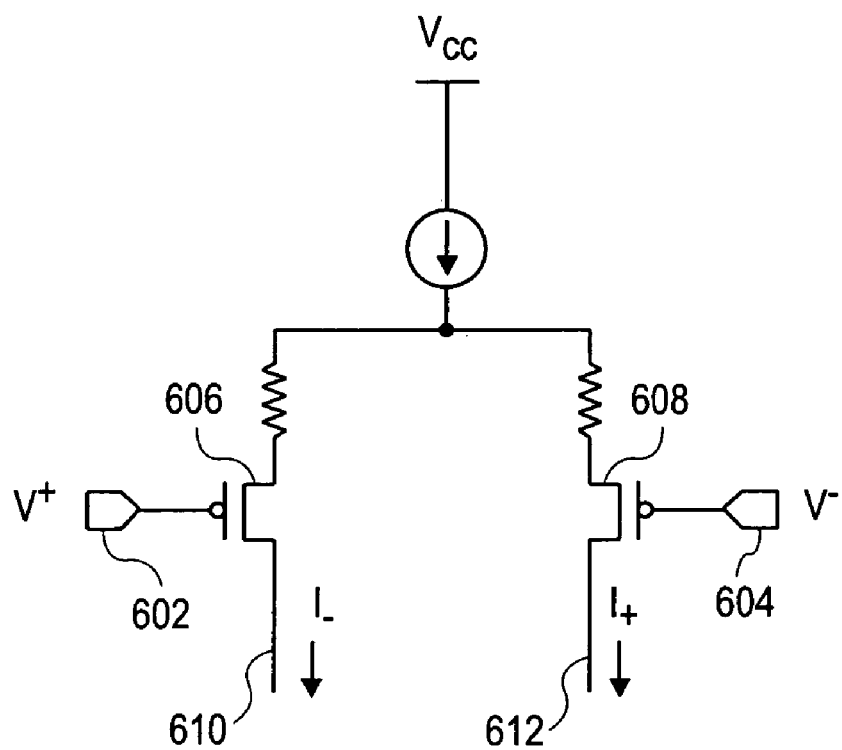
FIG. 6 illustrates a voltage-to-current converter.

It is relatively straightforward to implement a V-I converter. One such embodiment is provided in FIG. 6, where a differential voltage is applied at input ports 602 and 604 to modulate the gates of differential transistor pair 606 and 608, so that a differential current is provided at output ports 610 and 612.

Figure 7:
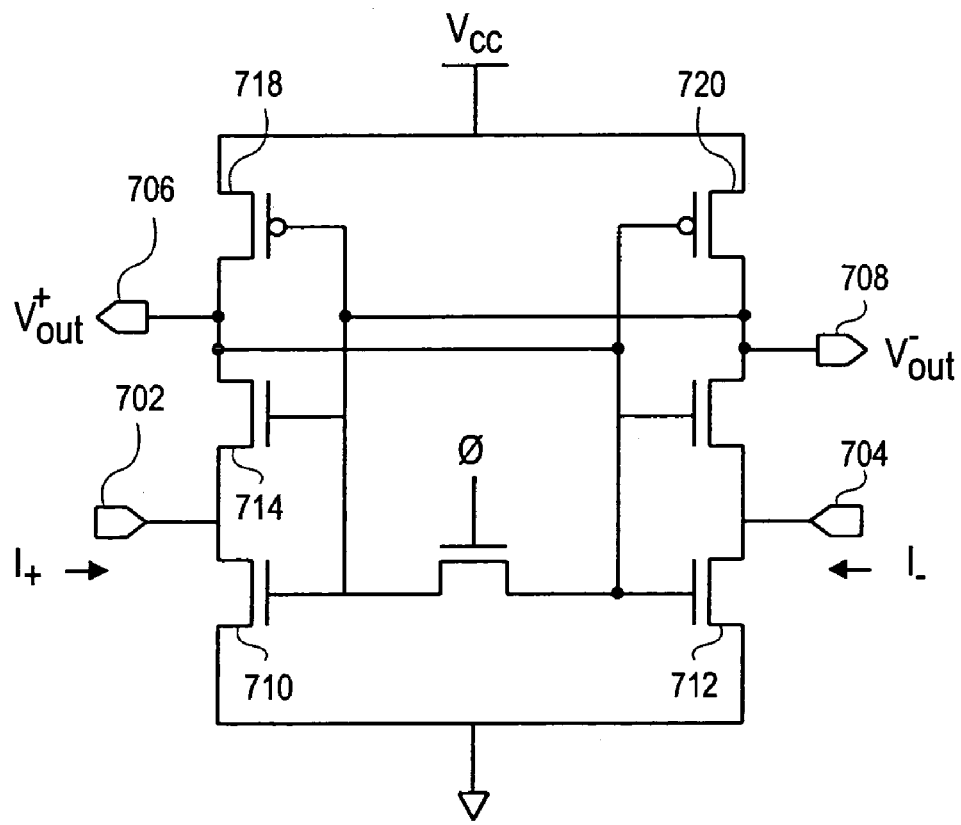
FIG. 7 illustrates a latch.

An embodiment of latch 324 is illustrated in FIG. 7. A differential input current ($I_+$, $I_-$) is applied to input ports 702 and 704, which are connected to nodes 306 and 308. A differential voltage output ($V_{OUT}^+$, $V_{OUT}^-$) is developed at output ports 702 and 704, where one of these voltages may be taken for a single-ended output. The particular connection of input ports and output ports, that is, whether input ports 702 and 704 are connected to nodes 306 and 308, respectively, or to nodes 308 and 306, respectively, and whether $V_{OUT}^+$ or $V_{OUT}^-$ is taken as the output voltage of the latch, determines the overall algebraic sign of the filter, and should be chosen accordingly.

The embodiment of FIG. 7 may be referred to as an active cascode differential latch. nMOSFETs 714 and 716 play the role of active cascode transistors, although they are not cascode transistors in the classical sense because their gate voltages are not biased to a constant voltage. A clock signal in FIG. 7 is denoted by φ. When clock signal φ is HIGH, the differential latch is put into a pre-charge mode where the output voltages at output ports 706 and 708 are forced to be substantially equal to one another. When clock signal φ is LOW, the differential latch is placed into an evaluation mode, where a differential voltage at output ports 706 and 708 develops. Cross coupled pMOSFETs 718 and 720 are connected as a latch, so that the differential voltage developed at output ports 706 and 708 is amplified to a logic level. Device sizes may be easily chosen such that nMOSFETs 710 and 712 operate in their triode regions and nMOSFETs 714 and 716 operate in their active regions. With nMOSFETs 710 and 712 operating in their triode regions, the differential latch of FIG. 7 has a relatively low input impedance, and furthermore, these nMOSFETs require a relatively small amount of headroom voltage.

Other filters may be connected to nodes 306 and 308 to also help mitigate intersymbol interference. For example, a discrete-time analog finite impulse response filter utilizing past received data samples may have its differential output connected to nodes 306 and 308.

Various modifications may be made to the disclosed embodiments without departing from the scope of the invention as claimed below. For example, in FIG. 3, 1-bit DAC 316 may be combined with N-bit DAC 330 to realize a (N+1)-bit DAC, where now lookup table 328 is expanded to have an additional input provided by transmitter 314.

Figure 8:
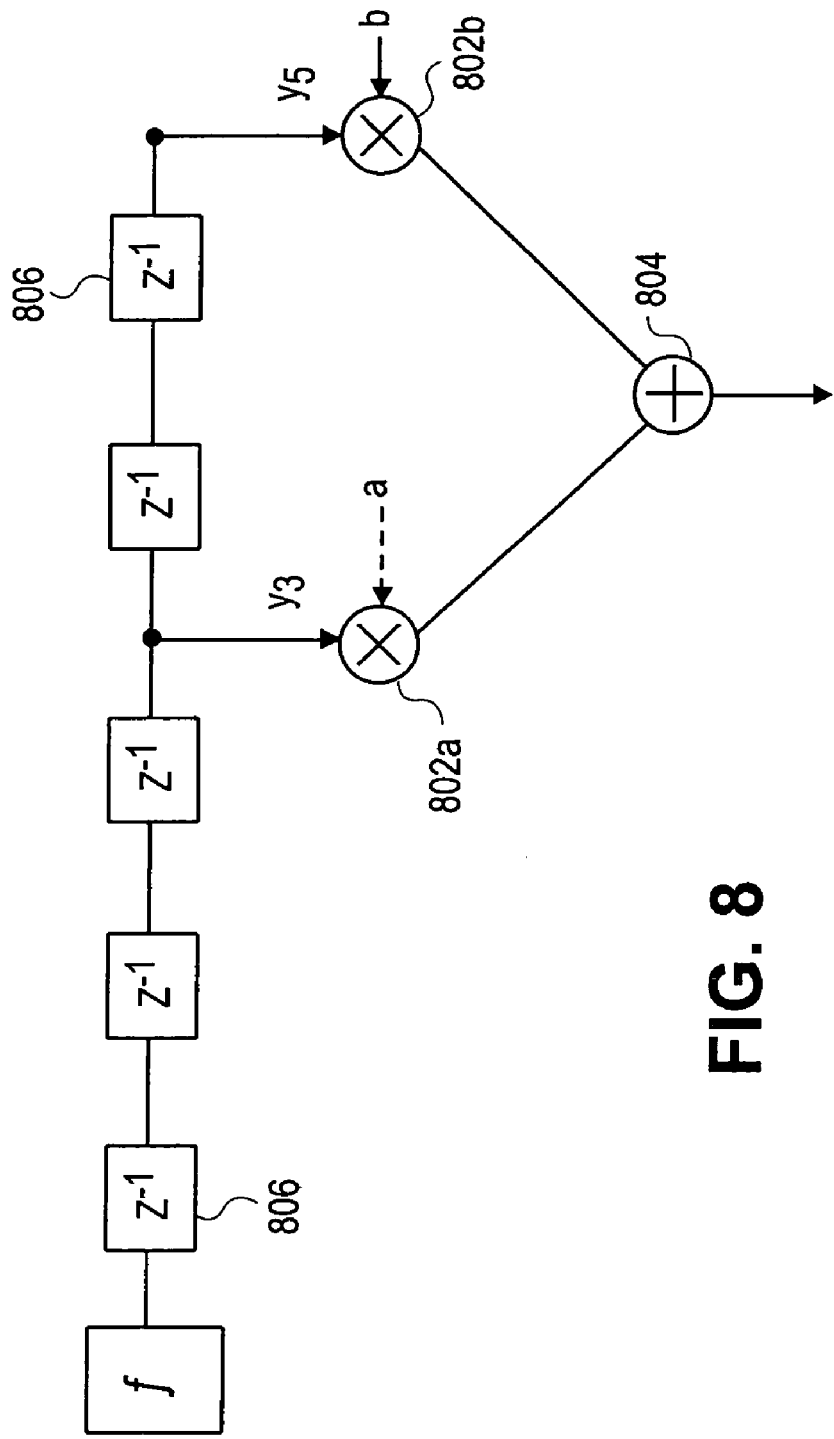
FIG. 8 illustrates an embodiment depicted at a high functional level to provide a mappling function in a decision feedback equalizer.

As another example, the mapping function of past decisions (outputs of latch 324) to differential current sourced to nodes 306 and 308 provided by the combination of memory 326, lookup table 328, and DACs 316 and 330, may be realized in a number of ways. A lookup table was discussed earlier in reference to FIG. 4b. Another embodiment is illustrated in FIG. 8, where now the values stored in the delay line of delay elements 806 are digital values representing −1 or 1. The values of the third and fourth taps are indicated by the variables $y_3$ and $y_5$, respectively, where the correspondence with the variables $x_3$ and $x_5$ is: x=0→y=−1 and x=1→y=1, where subscripts on the variables have been suppressed to indicate that the correspondence is not a function of tap position. Multipliers 802a and 802b multiply the variables $y_3$ and $y_5$ by −a and b, respectively, and summer provides the sum $-ay_3+by_5$. This sum determines the differential current sourced to nodes 306 and 308. The net result is that the same mapping function is provided as in the embodiment of FIG. 4b.

The embodiment of FIG. 8 is depicted at a high functional level. If the multiplication and summation is performed by digital logic, then an additional functional unit is added to convert the digital result $-ay_3+by_5$ to a differential current. Or, multipliers 802a and 802b may perform digital multiplication and the conversion of the result to a current, where now summer 804 represents a current summing function.

Furthermore, it is to be understood in these letters patent that the meaning of "A is connected to B" is that A and B are connected by a passive structure for making a direct electrical connection so that the voltage potentials of A and B are substantially equal to each other. For example, A and B may be connected by way of an interconnect, transmission line, etc. In integrated circuit technology, the "interconnect" may be exceedingly short, comparable to the device dimension itself. For example, the gates of two transistors may be connected to each other by polysilicon or copper interconnect that is comparable to the gate length of the transistors.

It is also to be understood that the meaning of "A is coupled to B" is that either A and B are connected to each other as described above, or that, although A and B may not be connected to each other as described above, there is nevertheless a device or circuit that is connected to both A and B. This device or circuit may include active or passive circuit elements. For example, A may be connected to a circuit element which in turn is connected to B.

It is also to be understood in these letters patent that a "current source" may mean either a current source or a current sink. Similar remarks apply to similar phrases, such as, "to source current".

It is also to be understood that various circuit blocks, such as current mirrors, amplifiers, etc., may include switches so as to be switched in or out of a larger circuit, and yet such circuit blocks may still be considered connected to the larger circuit because the various switches may be considered as included in the circuit block.

It is also to be understood that a claimed equality or match is interpreted to mean an equality or match within the tolerances of the process technology.

What is claimed is:

1. A circuit comprising:
   at least one node;
   a latch to provide logic signals indicative of comparisons on currents sourced into the at least one node;
   a memory unit to store the logic signals;
   a mapping circuit to source at least one feedback current into the at least one node as a function of a subset of the logic signals stored in the memory unit, the mapping circuit comprising
   a logic circuit to map the subset of the logic signals to a code word;
   a first digital-to-analog converter to source the at least one feedback current into the at least one node as a function of the code word; and
   a second digital-to-analog converter to source at least one current into the at least one node as a function of transmit data.

2. The circuit as set forth in claim 1, further comprising a voltage-to-current converter comprising at least one input port having at least one input voltage to source at least one received current into the at least one node indicative of the at least one input voltage.

3. A circuit comprising:
   at least one node;
   a latch to provide logic signals indicative of comparisons on currents sourced into the at least one node;
   a memory unit to store the logic signals;
   a mapping circuit to source at least one feedback current into the at least one node as a function of a subset of the logic signals stored in the memory unit;
   a digital-to-analog converter to source at least one current into the at least one node as a function of transmit data; and
   a voltage-to-current converter comprising at least one input port having at least one input voltage to source at least one received current into the at least one node indicative of the at least one input voltage.

4. The circuit as set forth in claim 3, comprising:
   the memory unit comprising a tap delay line.

5. A circuit comprising:
   a first node having a first current sourced to the first node;
   a second node having a second current sourced to the second node;
   a voltage-to-current converter comprising a first input port having a first input voltage and a second input port having a second input voltage, the voltage-to-current converter to source a first output current to the first node and a second output current to the second node in response to the first and second input voltages;

a latch having an evaluation mode, the latch connected to the first and second nodes to provide a sequence of logic signals for a sequence of evaluations, where each logic signal during an evaluation is indicative of whether the first current is greater in magnitude than the second current during the evaluation;

a memory unit to store the logic signals; and a mapping circuit to source a first feedback current to the first node and a second feedback current to the second node as a function of a subset of the logic signals stored in the memory unit.

6. The circuit as set forth in claim 5, further comprising:

a transmitter comprising a first output port and a second output port, the transmitter to transmit a differential signal on the first and second output ports as a function of transmit data, wherein the first and second output ports of the transmitter are connected to the first and second input ports of the voltage-to-current converter so that a transmit differential current is sourced to the first and second nodes;

a first digital-to-analog converter to provide a first differential current to the first and second nodes in response to the transmitted data, the first differential current substantially canceling out the transmit differential current.

7. The circuit as set forth in claim 6, the mapping circuit comprising:

a lookup table circuit to map the subset of logic signals to a code word; and a second digital-to-analog converter to provide the first and second feedback currents as a function of the code word.

8. The circuit as set forth in claim 5, the mapping circuit comprising:

a lookup table circuit to map the subset of logic signals to a code word; and a digital-to-analog converter to provide the first and second feedback currents as a function of the code word.

9. A circuit comprising:

a first node;

a second node;

a voltage-to-current converter comprising a first input port, a second input port, a first output port connected to the first node, and a second output port connected to the second node;

a latch connected to the first and second nodes to provide logic signals indicative of comparisons of a first current sourced into the first node and a second current sourced into the second node, a memory unit to store the logic signals provided by the latch during a sequence of comparisons; and a mapping circuit to source a first feedback current to the first node and a second feedback current to the second node as a function of a subset of the logic signals stored in the memory unit.

10. The circuit as set forth in claim 9, further comprising:

a transmitter comprising a first output port and a second output port connected to the first input port and the second input port, respectively, of the voltage-to-current converter, the transmitter to transmit a differential signal at its first and second output ports as a function of transmit data; and a first digital-to-analog converter to source a first transmit data dependent current to the first node and a second transmit data dependent current to the second node in response to the transmit data.

11. The circuit as set forth in claim 10, the mapping circuit comprising:

a logic circuit to map the logic signals into code words; and a second digital-to-analog converter to source the first and second feedback currents to the first and second nodes, respectively, as a function of the code words.

12. The circuit as set forth in claim 9, the mapping circuit comprising:

a logic circuit to map the logic signals into code words; and a digital-to-analog converter to source the first and second feedback currents to the first and second nodes, respectively, as a function of the code words.

13. The circuit as set forth in claim 9, the mapping circuit comprising a tap delay line.

14. A circuit comprising:

a first transmission line;

a second transmission line;

a first node;

a second node;

a voltage-to-current converter comprising a first input port connected to the first transmission line and a second input port connected to the second transmission line, the voltage-to-current comprising an output port connected to the first node and an output port connected to the second node;

a latch having an evaluation mode, the latch connected to the first and second nodes to provide a sequence of logic signals for a sequence of evaluations, where each logic signal during an evaluation is indicative of whether a first current sourced to the first node is greater in magnitude than a second current sourced to the second node during the evaluation;

a memory unit to store the logic signals; and a mapping circuit to source a first feedback current to the first node and a second feedback current to the second node as a function of a subset of the logic signals stored in the memory unit.

15. The circuit as set forth in claim 14, further comprising:

a transmitter comprising a first output port connected to the first transmission line and a second output port connected to the second transmission line, the transmitter to transmit a differential signal on the first and second transmission line as a function of transmit data; and a first digital-to-analog converter to provide a first differential current to the first and second nodes in response to the transmitted data.

16. The circuit as set forth in claim 15, the mapping circuit comprising:

a lookup table circuit to map the subset of logic signals to a code word; and a second digital-to-analog converter to provide the first and second feedback currents as a function of the code word.

17. The circuit as set forth in claim 14, the mapping circuit comprising:

a lookup table circuit to map the subset of logic signals to a code word; and a digital-to-analog converter to provide the first and second feedback currents as a function of the code word.

* * * * *